No. 884,087. PATENTED APR. 7, 1908.
F. GROSHANS.
HOLDER FOR DENTAL FLASKS.
APPLICATION FILED MAR. 29, 1906.
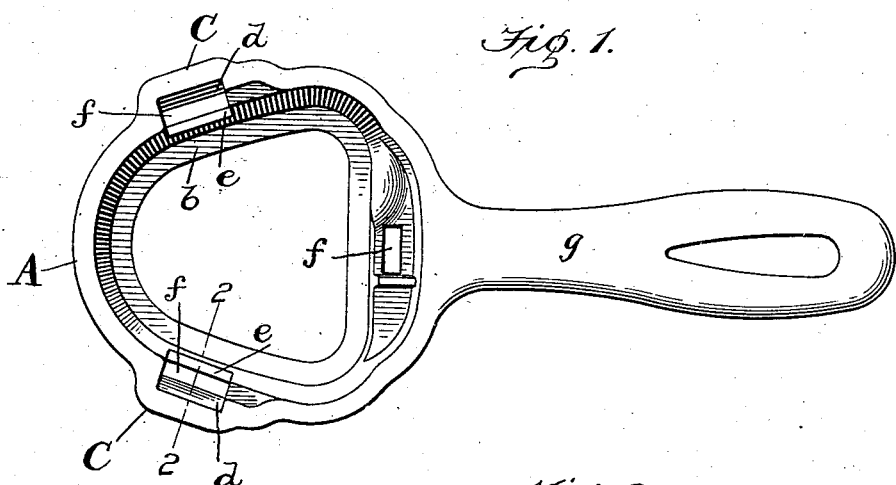
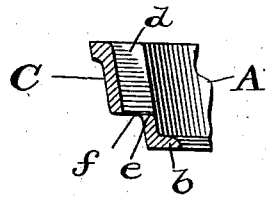
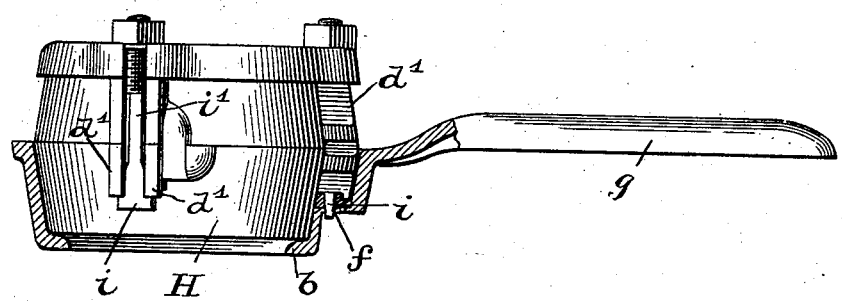
Witnesses
Edwin L. Bradford
G. Ferd. Vogt.
Inventor
Ferdinand Groshans
By Mann & Co,
Attorney

UNITED STATES PATENT OFFICE.

FERDINAND GROSHANS, OF BALTIMORE, MARYLAND.

HOLDER FOR DENTAL FLASKS.

No. 884,087.  Specification of Letters Patent.  Patented April 7, 1908.

Application filed March 29, 1906. Serial No. 308,685.

*To all whom it may concern:*

Be it known that I, FERDINAND GROSHANS, a citizen of the United States, residing at Baltimore, in the State of Maryland, have invented certain new and useful Improvements in Holders for Dental Flasks, of which the following is a specification.

This invention relates to improvements in holders for dental flasks.

One object of the invention is to provide an improved holder by means of which a hot dental flask may be conveniently held by one hand of an operator and carried.

The invention is illustrated in the accompanying drawings, in which,—

Figure 1 is a top plan view of the improved holder. Fig. 2 is a broken section of the holder taken on the line 2—2 of Fig. 1. Fig. 3 shows a vertical section of the holder and a side view of a dental flask in the holder.

The holder comprises a ring, A, of irregular shape corresponding to the shape of the exterior wall of the dental flask with which it is to be used. The irregular shaped ring at its bottom has an inturned flange, $b$, and from said bottom-flange upward the inner surface of the ring slightly inclines or flares, being larger at the top. The ring is provided on its exterior with several bulges, C, which afford space for the formation of recesses, $d$, open on the inner surface. The shape of the recesses is shown in Figs. 1 and 2; each recess has an outward bulging wall, C, a bottom edge or shoulder, $e$, and an open bottom slot, $f$, between the bulging wall and said edge or shoulder, $e$.

The recesses, $d$, on the inside of the ring serve to receive projecting parts, $d^1$, of corresponding shape on the outer side of the flask, H, and the open bottom slot, $f$, in the recess forms room for the lower head end, $i$, of the bolt on the flask. A handle, $g$, is attached to the irregularly-shaped ring, A.

When a dental flask has just been removed from the heater or muffle it is usually very hot and therefore difficult to handle, but when seated in the ring, A, the operator may by grasping the handle, $g$, with one hand hold the hot flask and with the other hand use a wrench or other tool to open or close the flask.

Having thus described my invention what I claim as new and desire to secure by Letters Patent is,—

1. A holder for dental flasks comprising an irregular-shaped ring larger at its top than at the bottom and having on its inner surface recesses which have an open bottom slot, and provided with a handle.

2. A holder for dental flasks comprising an irregular-shaped ring larger at its top than at the bottom and having on its inner surface a plurality of recesses,—said ring also having a handle projecting therefrom and the recesses in the ring being arranged to receive parts projecting from the outer side walls of a dental flask.

In testimony whereof I affix my signature in presence of two witnesses.

FERDINAND GROSHANS.

Witnesses:
CHARLES B. MANN, Jr.,
JOHN W. HEWES.